Aug. 4, 1931.   C. B. CLARK   1,817,349
METHOD OF EVAPORATING AND CONCENTRATING SOLUTIONS
Filed Feb. 5, 1927
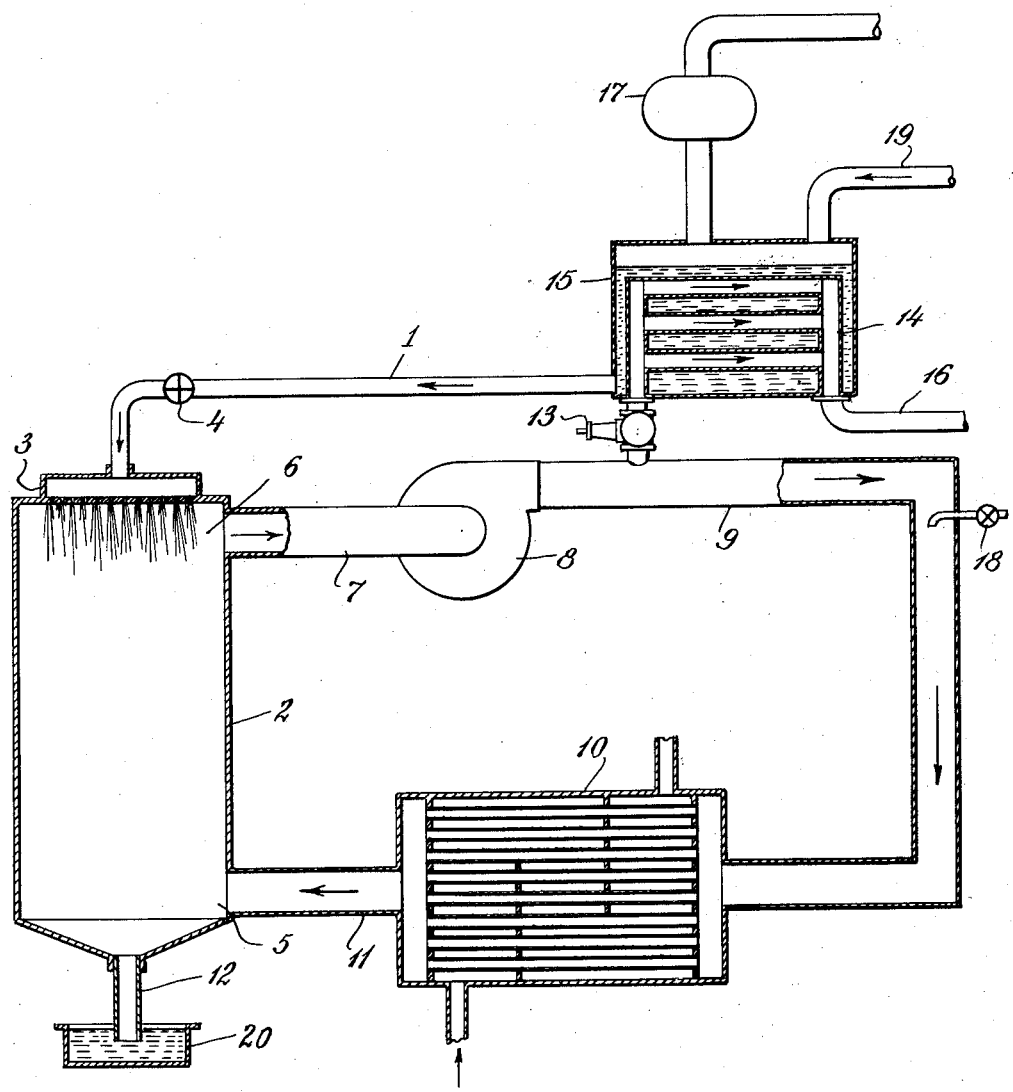
INVENTOR
Cyril B. Clark
BY Forbes Silsby
ATTORNEY Patented Aug. 4, 1931

1,817,349

UNITED STATES PATENT OFFICE

CYRIL B. CLARK, OF SCARSDALE, NEW YORK, ASSIGNOR TO GENERAL CHEMICAL COMPANY, OF NEW YORK, N. Y., A CORPORATION OF NEW YORK

METHOD OF EVAPORATING AND CONCENTRATING SOLUTIONS

Application filed February 5, 1927. Serial No. 166,038.

My invention relates to the art of evaporating liquid substances carrying solid matter in solution, and more particularly to the art of spray evaporating or concentrating solutions of inorganic salts which have a relatively small temperature range between their freezing and boiling points, as for example aluminum sulfate solutions.

The object of my invention is to provide an improved process for accomplishing such evaporation or concentration.

The invention will be more fully understood from the following detailed specification which is descriptive thereof and from the drawing accompanying and forming a part of the same. The drawing indicates diagrammatically a preferred system for carrying out my novel process particularly as applied to the evaporation or concentration of aluminum sulfate liquors.

In the spray evaporation or concentration of solutions of certain inorganic salts to produce concentrated liquors rather than a dry product, serious difficulties have been encountered in obtaining the product in the desired liquid state when employing the usual hot, dry air as the evaporating medium. Under such conditions the concentrated salt solution frequently solidifies or partially solidifies and becomes viscous so that it will not run from the evaporating tower. Such difficulties are encountered more particularly in the spray evaporation of salt solutions such as aluminum sulfate which have a relatively small temperature range between their freezing and boiling points at certain concentrations, for although the temperature of the hot, dry evaporating medium is always maintained considerably above the boiling point, such solutions will solidify or tend to solidify and become viscous. The phenomenon may possibly be explained by the fact that while the dry-bulb temperature of the hot air or other gas employed as the evaporating medium may be considerably in excess of the boiling point of the salt solution and thereby provide apparently proper conditions for continuously maintaining the solution liquid during evaporation, nevertheless, the wet-bulb temperature of the drying medium may be considerably lower, and, in case of salt solutions having a narrow temperature range between the freezing point and boiling point, may be considerably below the temperature of solidification of the salt solution. Since evaporation of the salt solution occurs at or near the wet-bulb temperature of the drying medium, the solution will tend to assume this temperature which may be below the temperature of solidification, and thus solidify or become viscous.

Whatever may be the explanation, however, I have discovered that by regulating the vapor content in the drying medium in accordance with the dry bulb temperature thereof such that the drying medium during its entire period of contact with the salt solution to be evaporated has a wet-bulb temperature constantly above the freezing point temperature of such solution, I am able to continuously evaporate such solutions as normally tend to solidify or become viscous and to obtain a concentrated product which is easily removed as a freely flowing liquid.

For example, if weak aluminum sulfate liquor of a strength of about 30° Bé. is dispersed into a tower in counter current flow with an evaporating medium of hot substantially dry air at a temperature of 400–750° F., the liquor will concentrate to about 40–45° Bé. and then become viscous and tend to solidify although the solidification temperature of a solution of a 40–45° Bé. concentration is not above 180—190° F. However, if the evaporating medium be humidified by the addition of water vapor to such an extent that the wet-bulb temperature of said medium is above 190° F., no solidification of the concentrated liquor occurs at this point, but the concentration may be continued to obtain a liquor of normal "cake strength" (62° Bé.) and the resulting liquor may be removed from the tower as a liquid. More particularly I have found in the case of the evaporation of aluminum sulfate, that satisfactory evaporation of weak liquor at 30° Bé. may be carried on to produce a liquor of about 62° Bé, provided the hot evaporating medium at 400–750° F., upon initial contact with the dispersed liquor has a moisture content equivalent to that of saturated air in contact with water at about 150° F., i. e. so that the evaporating medium contains about .2 pound of water vapor per pound of dry air. Under such conditions the wet-bulb temperature of the evaporating medium will be above 190° F., i. e. above the solidification temperature of such aluminum sulfate solution throughout the concentration. When the drying medium, therefore, contains this predetermined minimum amount of moisture, or more, evaporation of the aluminum sulfate liquor may be carried on smoothly and uniformly to yield a concentrated product of the commercial "cake strength", i. e. about 62° Bé. in the liquor state. If the dry-bulb temperature of the drying medium is increased, slightly less moisture is required to maintain the required wet-bulb temperature, but the important feature in my novel process for the evaporation of aluminum sulfate liquor is to regulate the moisture content with respect to the dry-bulb temperature such that the wet-bulb temperature is above 190° F.

In the accompanying drawing, I have shown a preferred system for carrying out my novel process more particularly as applied to evaporation and concentration of aluminum sulfate liquor. Week sulfate liquor preheated as desired is conducted by the conduit 1 to the evaporating chamber 2 and dispersed thereinto by means of a spray nozzle 3. The liquor may be otherwise dispersed as by means of a rotating disk or it may simply be allowed to flow in fine streams over a checkerwork of brick or other material contained in the chamber. The flow of liquor may be controlled by the valve 4. The hot evaporating medium is introduced at the inlet 5 at the bottom of the tower and flows upwardly counter current to the descending sulfate liquor, leaving the tower at the point 6. The outlet 6 communicates with the conduit 7 leading to the inlet side of a circulating fan or pump 8. From the outlet of the pump a conduit 9 leads to the heater 10 where the evaporating medium is heated by indirect contact with hot air, flue or waste gases, etc. The heater is connected by the conduit 11 with the bottom of the evaporating tower 2. A regulating outlet valve 13 which may be set at any desired pressure is located in a convenient position along the length of the conduit 9. The outlet valve may discharge directly to the atmosphere or to a condenser but according to my preferred system discharges into the steam coil 14 of a vacuum evaporator 15. The condensed steam from the coil 14 is removed through the outlet 16. A vacuum is maintained in the evaporator 15 by means of the pump or blower 17.

The operation of the apparatus above described is as follows:

The outlet valve 13 will be set for a certain predetermined pressure for instance slightly over atmospheric pressure, a suitable heating medium will be passed through the heater 10, and the circulating fan 8 will be driven to cause the air within the apparatus to circulate therethrough in the direction shown by the arrows in the drawing. As the air is gradually heated, water or steam is added through the pipe 18 until a moisture content equivalent to that of saturated air in contact with water at about 150° F. is obtained, the heating is continued to render the air unsaturated in contact with the aluminum sulfate liquor to be evaporated, and preferably until the air and steam mixture becomes superheated to a temperature of 400–750° F. These conditions of humidity and dry-bulb temperature will provide a wet-bulb temperature with respect to the liquor to be evaporated of about 190° F. or above. The aluminum sulfate liquor to be evaporated is then admitted to the tower 2 through the spray nozzle 3. The liquor may be cold and of the strength at which it normally comes from the digestion process, namely about 30° Bé. Preferably, however, it is preheated and partially concentrated as hereinafter pointed out to a strength of 40–45° Bé. As the liquor is sprayed into the chamber the water is evaporated therefrom and the steam thus produced passes out through the outlet 6 by means of the conduit 7 through the circulating fan 8, then to the heater 10 and from the latter into contact with the spray of liquor again. The liquor entering at the top of the tower at a strength of 30–45° Bé. is concentrated to 62° Bé., commercial "cake strength" and flows readily without sticking or solidifying from the bottom of the tower through the outlet 12 and seal 20 to pans or to spray cooling apparatus or other final solidfying processes where it is permitted to solidfy upon cooling. Water evaporates from the liquor into the atmosphere of air in the evaporator, causing a rise in pressure within the apparatus. When the pressure has reached the predetermined value, the valve 13 opens and in normal operation remains open, adjusting its opening to the rate of supply of water and heat within the circuit. The air which originally occupied the closed system is very soon displaced by evaporated water, and in the normal operation of the system after that time is reached the evaporating medium is steam which has been superheated in the heater 10 to a temperature of 400–750° F., which is above the boiling point of the aluminum sulfate liquor. Under such conditions the water vapor pressure of the atmosphere of superheated steam in the evaporating chamber is less than the vapor pressure of the heated liquor and the wet-bulb temperature of the atmosphere of superheated steam with respect to the aluminum sulfate liquor is above the freezing point of the liquor. Accordingly, evaporation of the liquor will occur only at or above the boiling point thereof and a cooling of the liquor to its solidification temperature by evaporation will be prevented. The boiling point temperature will depend, of course, upon the pressure maintained, but when, as in the present case, the pressure is approximately atmospheric or above, this temperature will be above the temperature of solidification, namely 190° F.

The evaporating medium leaves the evaporating chamber at about 225° F. when the system is operating at normal pressure, or at a temperature sufficiently high to prevent condensation of the steam before its return to the heater 10. The steam at this low superheat which is exhausted through the valve 13 is preferably utilized in preheating the sulfate liquor entering the evaporating chamber 2 or in partial concentration of weak liquor. In the system shown in the drawing, such exhaust steam is conducted through the coils of a vacuum evaporator 15 into which weak sulfate liquor of about 30° Bé. is fed through the inlet 19. The partially concentrated liquor leaving the vacuum evaporator will be of a strength of 40-45° Bé. and at this strength is particularly adapted for the subsequent spray evaporating process. A predetermined vacuum is maintained by the pump 17 and the exhaust vapors leaving the pump may be utilized in preheating the weak liquor prior to its introduction to the vacuum evaporator. By this system the heat employed is most efficiently utilized in the concentration of the weak liquor to the desired strength.

Obviously it is not necessary to employ a closed system or to recirculate any portion of the evaporating medium, and my invention is independent of such feature. If desired, the evaporating medium may be continuously humidified to the predetermined value to provide a wet-bulb temperature, when subsequently heated, which is above the freezing point of the particular salt solution to be evaporated and in the case of aluminum sulfate liquor above 190° F. Such humidified medium is then heated to the determined temperature and the resulting unsaturated medium is contacted with the dispersed salt solution. The humidity and temperature may be automatically controlled in any well-known manner, if desired, by means of wet and dry-bulb thermometers. All of the evaporating medium passing from the concentrating chamber, preferably at a low superheat, that is, at a temperature slightly above the dewpoint, may then be discharged to a condenser or utilized in preheating or vacuum evaporating the liquor which is to be subsequently spray evaporated.

I am aware of the fact that superheated steam has hitherto been employed in systems for the desiccation and drying of such substances as milk and eggs which are deleteriously affected if dried in an oxidizing atmosphere, and my process, wherein the water content of the evaporating fluid is regulated according to the dry-bulb temperature thereof to provide or exceed a predetermined minimum amount in order to produce a desired wet-bulb temperature thereof, is to be clearly distinguished therefrom. With my novel process a very efficient evaporation and concentration of salt solutions, which normally tend to solidify and tend to become viscous when spray evaporated, may be effected and the concentrated product obtained as a free flowing liquid.

The term "wet-bulb temperature" as employed throughout the specification and claims, refers to the dynamic equilibrium temperature attained by a surface wetted with the solution undergoing evaporation when exposed to air or other drying gas under "adiabatic" conditions. It may be determined in the customary manner of determining wet-bulb temperature except that the wet-bulb will be moistened with the solution undergoing evaporation rather than with water as is usual. The term "unsaturated" when employed in this specification and in the claims with reference to an atmosphere which is in contact with a solution to be evaporated, denotes an atmosphere which has a lower vapor pressure of the vapor of the solution than has the solution itself.

I claim:

1. In the process of concentrating a solution of an inorganic salt wherein said solution is concentrated until it has a relatively small temperature range between its freezing and boiling points, that improvement which consists in directly contacting the solution with a heated atmosphere unsaturated with vapor of the solution but having a wet-bulb temperature with respect thereto above the freezing point of said solution.

2. In the process of concentrating a solution of an inorganic salt wherein said solution is concentrated until it has a relatively small temperature range between its freezing and boiling points, that improvement which consists in directly contacting said solution with a heated atmosphere and regulating the content of the vapor of said solution in said atmosphere in accordance with the dry-bulb temperature thereof such that the wet-bulb temperature thereof is above the freezing point of said solution.

3. The method of concentrating aluminum sulfate liquor which comprises the step of directly contacting the liquor with a heated evaporating medium unsaturated with water vapor, but having a wet-bulb temperature with respect to the liquor above the freezing point of the said liquor.

4. The process of concentrating aluminum sulfate liquor which comprises the step of directly contacting the liquor with a heated evaporating medium, and regulating the moisture content of said atmosphere in accordance with the dry-bulb temperature thereof such that the wet-bulb temperature thereof is above 190° F.

5. The method of concentrating aluminum sulfate liquor which comprises the step of contacting the liquor directly with a heated evaporating medium unsaturated with water vapor but having a wet-bulb temperature of not less than 190° F. with respect to said liquor.

6. The method of concentrating aluminum sulfate liquor which comprises the step of contacting the liquor directly with a heated evaporating medium unsaturated with water vapor but having at its point of initial contact with the liquor a moisture content at least equivalent to that of saturated air at 150° F.

7. The method of concentrating aluminum sulfate liquor which comprises the step of directly contacting the liquor with superheated steam having a water vapor pressure less than the vapor pressure of the liquor in contact therewith and having a wet-bulb temperature with respect thereto above the freezing point of said liquor.

8. The process of concentrating aluminum sulfate liquor which comprises dispersing weak sulfate liquor, contacting the dispersed liquor with superheated steam, having a water vapor pressure less than the vapor pressure of the liquor in contact therewith and having a wet-bulb temperature with respect thereto above the freezing point of said liquor, removing the concentrated liquor in fluid form, and exhausting the evaporated moisture at a temperature of low superheat.

9. The process of concentrating aluminum sulfate liquor which comprises dispersing partially concentrated aluminum sulfate liquor, contacting said dispersed liquor with superheated steam, having a water vapor pressure less than the vapor pressure of the liquor in contact therewith and having a wet-bulb temperature with respect thereto above the freezing point of said liquor, removing the concentrated liquor in fluid form, exhausting the evaporated fluid at a temperature of low superheat, and utilizing the exhausted fluid for preliminary concentration of weak aluminum sulfate liquor to produce the partially concentrated sulfate liquor first mentioned.

10. The process of concentrating aluminum sulfate liquor which consists in dispersing said liquor into an atmosphere of its own vapor, circulating such atmosphere into repeated contact with said liquor and superheating it during its circulation to a temperature at which said vapor has a pressure less than the vapor pressure of the liquor with which it is contacted, and a wet-bulb temperature with respect thereto above the freezing point of said liquor, removing the concentrated liquor as a fluid, and continuously exhausting the evaporated moisture.

11. The process of concentrating aluminum sulfate liquor which comprises the steps of partially evaporating said liquor in a vacuum evaporator, dispersing said partially concentrated liquor into an atmosphere of its own vapor, circulating said atmosphere into repeated contact with said liquor and superheating it during its circulation to a temperature at which said vapor has a pressure less than the vapor pressure of the liquor with which it is contacted, and a wet-bulb temperature with respect thereto above the freezing point of said liquor, removing the concentrated liquor as a fluid, continuously exhausting the evaporated moisture at low superheat and utilizing the exhausted superheated medium to provide heat for the partial concentration of the fresh liquor in the vacuum evaporator.

12. In the process of concentrating a solution of an inorganic salt wherein said solution is concentrated until it has a relatively small temperature range between its freezing and boiling points, that improvement which consists in directly contacting the solution with superheated steam having a vapor pressure of the vapor of said solution less than the vapor pressure of the solution in contact therewith, and having a wet-bulb temperature with respect thereto above the freezing point of said solution.

13. In the process of concentrating an aqueous solution of an inorganic salt wherein said solution is concentrated until it has a relatively small temperature range between its freezing and boiling points, that improvement which consists in directly contacting the solution with superheated steam having a water vapor pressure less than the vapor pressure of the solution in contact therewith, and having a wet-bulb temperature with respect thereto above the freezing point of said solution.

14. In the process of concentrating a solution of an inorganic salt wherein said solution is concentrated until it has a relatively small temperature range between its freezing and boiling points, that improvement which comprises directly contacting the solution with a heated atmosphere unsaturated with vapor of the solution, maintaining said solution and atmosphere in direct contact until the solution attains a concentration at which it would freeze when directly contacted with an atmosphere free from vapor of the solution and at any temperature above the freezing point thereof, and maintaining the wet bulb temperature of the atmosphere in contact with such solution with respect thereto above the freezing point of the solution, whereby said solution is maintained in the liquid phase during the concentration thereof.

15. In the process of concentrating a solution of an inorganic salt wherein said solution is concentrated until it has a relatively small temperature range between its freezing and boiling points, that improvement which consists in directly contacting the solution with a heated atmosphere unsaturated with vapor of the solution but having a wet bulb temperature with respect thereto above the freezing point of said solution, and maintaining said solution and atmosphere in direct contact until the solution attains a concentration at which it would freeze when directly contacted with an atmosphere free from vapor of the solution and at the temperature of the aforesaid atmosphere contacted therewith.

In testimony whereof, I affix my signature.

CYRIL B. CLARK.